Nov. 10, 1959 H. K. M. GROSSER ET AL 2,912,484

SYSTEM FOR GUARDING THE TRANSMISSION OF MESSAGES

Filed Aug. 29, 1955 2 Sheets-Sheet 1

INVENTORS
HERMANN KARL MARIA GROSSER
PIETER HARKEMA

BY Fred M Vogel

AGENT

SYSTEM FOR GUARDING THE TRANSMISSION OF MESSAGES

Filed Aug. 29, 1955 2 Sheets-Sheet 2

INVENTORS
HERMANN KARL MARIA GROSSER
PIETER HARKEMA
BY Fred M Vogel
AGENT

United States Patent Office 2,912,484

Patented Nov. 10, 1959

2,912,484

SYSTEM FOR GUARDING THE TRANSMISSION OF MESSAGES

Hermann Karl Maria Grosser and Pieter Harkema, Hilversum, Netherlands, assignors, by mesne assignments, to North American Philips Company, Inc., New York, N.Y., a corporation of Delaware Application August 29, 1955, Serial No. 530,925

Claims priority, application Netherlands September 1, 1954

4 Claims. (Cl. 178—4.1)

This invention relates to systems for guarding the transmission of messages sent from a first station to a second station via a transmission path.

In systems for transmitting messages, the connection should be guarded effectively in order to prevent telegrams from being lost.

The present invention supplies this need. In the system in accordance with the invention, a characteristic clearing signal is transmitted at the end of a message, following which the first station brings the transmission path into a characteristic rest state, whilst the two stations each comprise a clearing signal detector. Furthermore, provision is made of means for transmitting a service signal from the second station to the first station on response of the clearing signal detector of the second station and means giving a warning in the first station if, within a predetermined time after response of the clearing signal detector, said station does not receive a service signal, and furthermore warning means in the second station, which respond if the characteristic rest state appears in the transmission path without the clearing signal detector of the second station having responded.

Figures 1A, 1B:
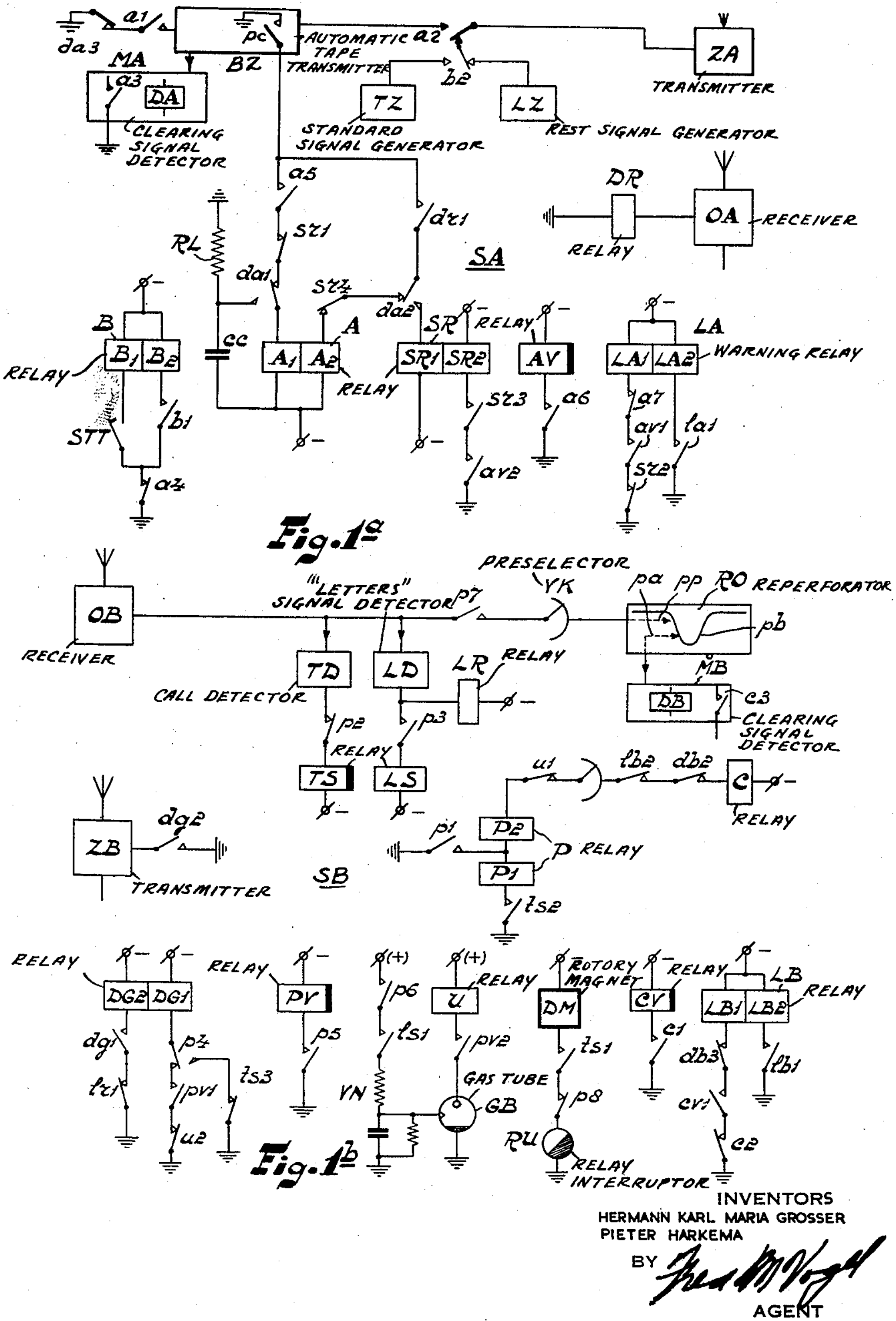

In order that the invention may be readily carried into effect it will now be described with reference to the accompanying drawings, given by way of example, which show one form thereof, wherein:

Fig. 1*a* is a preferred circuit of a first station;

Fig. 1*b* is a preferred circuit of a second station; and

Figure 2:
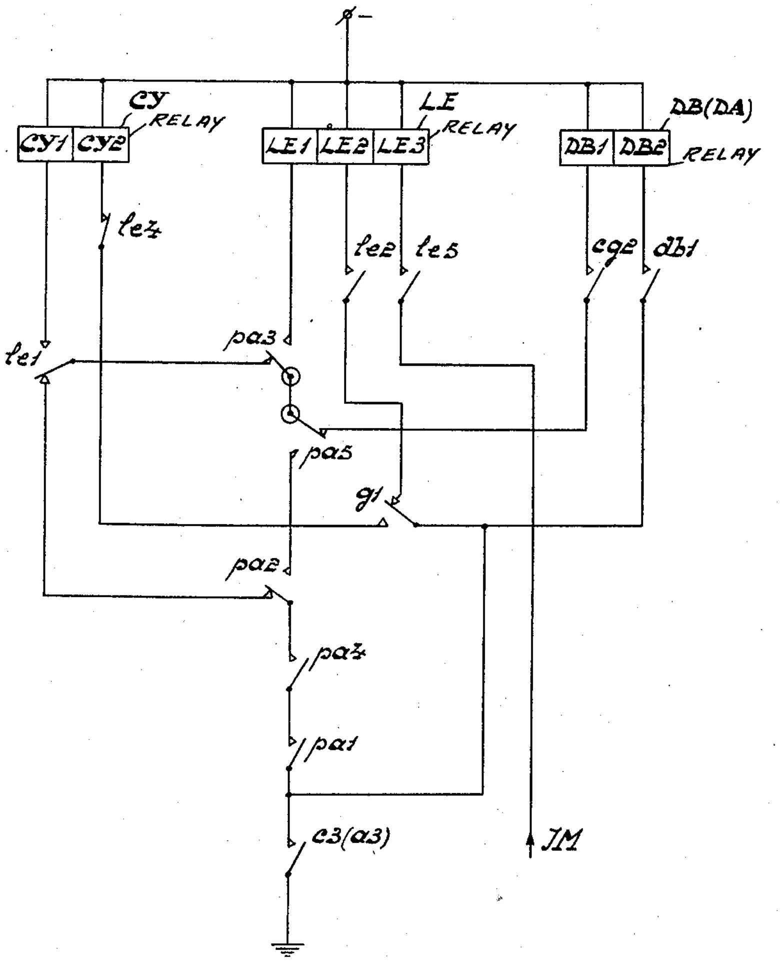

Fig. 2 is a preferred circuit of a clearing signal detector as used in the circuits of Figs. 1*a* and 1*b*.

Figs. 1*a* and 1*b* represent a circuit-arrangement guarding the transmission of a telegram from the automatic tape transmitter BZ in station SA, of Fig. 1*a* to the reperforator RO in station SB of Fig. 1*b*. The stations SA and SB each comprise a clearing signal detector MA and MB respectively, the operation of which will be set out with reference to Fig. 2. The drawings show only those parts of the arrangement which are necessary for making the invention well understood.

From station SA signals are transmitted to station SB by means of a radio transmitter ZA and a radio receiver OB, whilst signals can be transmitted in the reverse sense via transmitter ZB and receiver OA. In the rest state, station SA continually emits a characteristic rest signal that is to say the signal "letters" of the international telegraph alphabet No. 2. This signal consists of five rest elements and is transmitted to the radio transmitter ZA via rest contacts $b_2$ and $a_2$ of the diagrammatically represented standard signal generator LZ.

Transmission of a message from station SA to station SB is initiated by depressing a key STT to energize a relay B via winding $B_1$. A relay B closes via rest contact $a_4$, work contact $b_1$ and winding $B_2$ a holding circuit for itself. Contact $b_2$ interrupts the transmission of the rest signal and connects the standard signal generator TZ through rest contacts $a_2$ to the transmitter ZA in order to bring the transmission channel into the calling state. The generator TZ continually supplies a signal T made up of four work elements followed by one rest element. Station SB comprises a call detector TD which may be of usual construction and responds on receiving the signal T several times in succession, in which case relay TS is energized via rest contact $p_2$. By way of work contacts $ts_1$, rest contact 8 and a relay interrupter RU the relay TS closes an energization circuit for a rotary magnet DM to the effect of actuating the preselector VK to find a free reperforator RO. Work contact $ts_2$ prepares a test circuit via relay P and rest contact $u_1$. When the preselector VK finds a free outlet relay P is energized in series with a relay C via a circuit from earth through work-contact $ts_2$, windings $P_1$ and $P_2$ of relay P, rest contact $u_1$, wiper and outlet contact of preselector VK, rest contacts $lb_2$ and $db_2$ and the winding of relay C to the negative terminal (−) of a battery (not shown). A relay P short-circuits via work contact $P_1$ its high-ohmic winding $P_1$ so that the outlet concerned is marked busy. At the same time rest contact $P_8$ opens the energization circuit of the rotary magnet DM as a result of which the preselector VK is immobilized. Work contact $P_7$ connects the radio-receiver OB through a wiper of the pre-selector VK to the reperforator RO. Relay DG is energized through winding $DG_1$ and work contacts $p_4$ and $ts_3$. The relay DG locks via winding $DG_2$, work contact $dg_1$ and rest contact $lr_1$ independently of contact $ts_3$. On closure of contact $dg_2$ the transmitter ZB emits in a manner not further described, see for example U.S. Patent No. 2,820,089, issued January 14, 1958, a service signal to station SA as an indication that the calling signal has been received and station SB is ready to receive the message. On receiving the service signal the relay DR in station SA is energized, which relay closes an energization circuit, via contact *pc*, work contact $dr_1$ and rest contacts $da_2$, $sr_4$, through the winding $A_2$ of relay A. Relay A closes, via contact *pc*, work contact $a_5$, rest contact $sr_1$, $da_1$ and winding $A_1$, a locking circuit for itself. Due to closure of work contact $a_1$ in series with rest contact $da_3$ the automatic tape transmitter BZ is started, the outlet of which is now connected by way of work contact $a_2$ to the transmitter ZA, thus transmitting automatically the telegraph signals recorded in the tape of tape transmitter BZ to station SB where they are recorded by means of diagrammatically represented punching pins *pp* in the tape *pb* of the reperforator RO. At the beginning of the message the signal "letters" is recorded in the tape of the tape transmitter BZ. On receiving this signal in station SB, LR becomes operative which is energized by the signal—"letters"—detector LD. Rest contact $lr_1$ interrupts the holding circuit of relay DG with the result that this relay is de-energized and the service signal stops.

At the end of the message a characteristic clearing signal has been punched into the tape of tape transmitter BZ. This signal consists of the combination of the signal "letters," the signal "figures" and the letter "d." The signal "letters" consists of five rest elements the signal "figures" consists of two rest elements, one work element and two rest elements, and the letter "d" consists of one rest element, two work elements, one rest element and a work element. The reperforator RO is constructed in such manner as to punch the rest elements into the tape. The reperforator RO furthermore comprises five control pins *pa* which are shown diagrammatically and control make and break contacts $pa_1$, $pa_2$, $pa_3$, $pa_4$, $pa_5$ of the clearing signal detector shown in Fig. 2. Such a reperforator is of a construction known per se. This arrangement operates as follows:

On receiving a telegraph signal the elements are punched into the tape *pb* by means of pins *pp*, following which the testing which pins are lifted and the tape is advanced. The newly punched signal then is at the testing pins *pa*, which subsequently test this signal. The pins *pa* remain in the testing position until the following signal has been punched. On receiving a telegraph signal, the reperforator supplies a further impulse by way of the line IM to the clearing signal detector shown in Fig. 2. The relays CY, LE and DB of the clearing signal detector are deenergized in the rest state. If the signal "letters" is punched into the tape, which signal is made up of five rest elements, the contacts $pa_1$, $pa_2$, $pa_3$, $pa_4$ and $pa_5$ are caused to assume the operating position during the next testing operation, thereby energizing relay LE through its winding $LE_1$. Relay LE closes by way of its winding $LE_2$, work contact $le_2$, rest contact $cy_1$, and work contact $c_3$ a blocking circuit for itself. As has been stated, the reperforator RO supplies, on the reception of the next signal, an impulse over the line IM to the clearing signal detector as a result of which the winding $LE_3$ of relay LE is magnetized in a sense opposite to that of the windings $LE_1$ and $LE_2$. Since the relay LE then is magnetized through two windings in one sense and only one winding in the other sense it remains held. On lifting the testing pins *pa* after punching the next signal, the relay LE is held via its winding $LE_2$. If the following signal is the signal "figures" the relay CY becomes energized by way of work contact $c_3$, work contacts $pa_1$, $pa_4$, $pa_2$, $pa_5$, rest contact $pa_3$, work contact $le_1$, and winding $CY_1$ during the next testing operation with the result that relay LE becomes de-energized. If next the signal "D" comes in, which is made up of one rest element, two work elements, one rest element and a work element, the relay DB is energized by way of work contact $c_3$, work contacts $pa_1$, $pa_4$, rest contacts $pa_2$, $le_1$, $pa_3$, $pa_5$, work contact $cy_2$ and winding $DB_1$. The relay DB locks through work contacts $c_3$, $db_1$ and winding $DB_2$. Energization of the relay DB is the criterion of receiving a clearing signal.

Should next to the signal "letters" not the signal "figures" but a different signal be received, the relay CY would not be energized and relay LE would become de-energized by the action of the impulse supplied over lead IM at the instant at which the next signal is punched, since in this case the relay LE is energized only through winding $LE_2$ in one sense and through winding $LE_3$ in the other sense. If the signal "letters" comes in several times in succession the relay LE is held.

The clearing signal detector MA in station SA is similarly designed on the understanding that relay DA plays the role of relay DB, and contact $a_3$ that of contact $c_3$. Hence, the relays DA and DB will normally become energized at the end of a message. Through rest contact $db_2$ the relay DB interrupts the energization circuit of relay P so that relays P and C become de-energized as well as relay PV which has been energized via work contact $P_5$. For a short time period between de-energization of the relays P and PV the rest contact $P_4$ connects the relay DG through work contact $pv_1$ and rest contact $u_2$ to earth with the result that the transmitter ZB again emits a service signal and the relay DR of station SA becomes energized. On energization of relay BA the rest contacts $ba_1$ and $ba_2$ interrupt the energization circuit of relay A, whilst the work contact $ba_1$ connects the capacitor CC in parallel with the winding $A_1$ so that the relay A becomes de-energized in a delayed manner. The relay SR becomes energized by way of work contacts *pc*, $dr_1$, $da_2$ and locks by way of winding $SR_2$ and work contacts $sr_3$ and $av_2$. When rest contact $d_2$ opens the tape transmitter BZ stops. Work contact $a_3$ opens the energization circuit of relay DA so that the relay becomes de-energized. Through rest contact $b_2$, rest contact $a_2$ connects the standard signal generator LZ to the radio transmitter ZA so that the latter continually transmits the signal "letters" and the transmission path has resumed the rest state. On response of the "letters"-detector LD energization of relay LR will de-energize the relay DG with the result that transmission of the service signal is terminated and the relay DR is also de-energized, hence the connection is closed.

Let it now be assumed that the reperforator RO becomes defective, for example because one of the pins does not function. The characterizing clearing signal is chosen in such manner that it never occurs in the normal text of a message and normally, on reception of said signal, each of the five pins of the reperforator acts at least once. Therefore on the occurrence of said disturbance, the relay DB cannot be energized so that relay P is held and the radio-transmitter ZB cannot transmit the service signal. As has been pointed out, the relay A becomes de-energized in a retarded manner on energization of relay DA, which is followed by de-energization of relay AV which has been energized through work contact $a_6$. Since in this instance the relay DR has not been energized and consequently relay SR has no more been energized, the warning relay LA is energized via rest contact $sr_2$, work contact $av_1$, rest contact $a_7$ and winding $LA_1$, and locks via contact $La_1$ and winding $LA_2$.

In a manner not further described an acoustic or visual warning is given in station SA and, if required, further operations initiated under the control of relay LA. On closure of rest contact $a_2$ the transmitter ZA again transmits the signal "letters" under the control of the generator LZ to indicate the characteristic rest state of the transmission path. In this instance, however, the detector MB has not detected the clearing signal and the relay DB has not become energized so that the relay P is still energized. The incoming signals are also tested by the "letters" detector LD which responds on the appearance of said signal, hence the relay LS becomes energized via work contact $p_3$. The work contact $ls_1$ connects a source of positive voltage (+) through work contact $p_6$ and the integrating network VN to the ignition electrode of the gas filled tube GB. On reception of the signal "letters" several times in succession, as in the present instance, the voltage of the ignition electrode rises to such a value as to make tube GB conductive. This results in that relay U is magnetized via work contact $pv_2$ and the main discharge path of the tube. Rest contact $u_1$ opens the energization circuit of relay P and relay C. Upon de-energization of relay P the relays LS, PV and U are also demagnetized. Dropping out of relay C results in energization of relay LB via rest contact $c_2$, work contact $cv_1$, rest contact $db_3$ and winding $LB_1$, so that the relay CV drops out in a retarded manner due to opening of work contact $c_1$. Relay LB locks via work contact $lb_1$ and the winding $LB_2$ and operates via contacts (not shown) warning means in station SB.

It might happen that the tape of tape transmitter BZ is broken or the operator forgets to punch the clearing signal into the tape at the end of the message. In this case a clearing signal is detected neither at the transmission end by the device MA nor at the reception end by the device MB. In order to warn also in this event the tape transmitter BZ comprises a device which responds if the tape of the tape transmitter runs out and contact *pc* opens. This results in that the relay A drops out in a retarded manner and a warning is given in the aforesaid manner in the two stations SA and SB.

What is claimed is:

1. A message transmission system comprising a first station, a second station, and a transmission path between said stations, said first station comprising means to transmit a characteristic clearing signal at the end of a message and means to place the transmission path into a characteristic rest state after transmitting said clearing signal, said second station comprising a clearing signal detector and means to transmit a service signal in response to the reception by said detector of said clearing signal, first warning means adapted to respond upon failure of said first station to receive said service signal within a predetermined time after the transmission of said clearing signal, and second warning means adapted to respond upon the occurrence of said characteristic rest state without being preceded by the detection of said clearing signal by said detector.

2. A system as claimed in claim 1, in which said second station includes a reperforator for recording said message, said detector being connected to receive the recorded message.

3. A system as claimed in claim 1, in which said second station includes a reperforator for recording said message, said reperforator comprising a plurality of punching pins for recording messages on tape, and said clearing signal being coded so as to cause all of said punching pins to be actuated at least once.

4. A system as claimed in claim 1, including means for terminating said service signal upon the occurrence of said characteristic rest state.

References Cited in the file of this patent

UNITED STATES PATENTS 2,752,414 Przysiecki ---------------- June 26, 1956